United States Patent [19]

Mirebeau et al.

[11] Patent Number: 4,555,458
[45] Date of Patent: Nov. 26, 1985

[54] ELECTROLYTE FOR A LEAD ACID ACCUMULATOR, AND AN ACCUMULATOR USING SAID ELECTROLYTE

[75] Inventors: Pierre Mirebeau, Villebon sur Yvette; Jean Gindre, Vierzon, both of France

[73] Assignee: Compagnie Europeenne d'Accumulateurs, S.A., Paris, France

[21] Appl. No.: 537,390

[22] PCT Filed: Feb. 15, 1983

[86] PCT No.: PCT/FR83/00030

§ 371 Date: Sep. 15, 1983

§ 102(e) Date: Sep. 15, 1983

[30] Foreign Application Priority Data

Feb. 15, 1982 [FR] France ............................. 82 02420

[51] Int. Cl.[4] ............................................. H01M 6/04
[52] U.S. Cl. ..................................... 429/203; 429/204
[58] Field of Search ......................... 429/203, 204, 205

[56] References Cited

U.S. PATENT DOCUMENTS

| 1,748,485 | 2/1930 | Kugel | 429/203 |
| 3,011,007 | 11/1961 | Evers et al. | 429/203 |
| 3,447,969 | 6/1969 | Tudor et al. | 429/203 |
| 3,887,488 | 6/1975 | Scott et al. | 252/389 A |
| 4,049,733 | 9/1977 | Martan | 260/668 C |

FOREIGN PATENT DOCUMENTS 291020 9/1928 United Kingdom ................ 429/203

OTHER PUBLICATIONS

Chemical Abstracts: vol. 98, Nos. 163757, 162220, 134328, 62114; vol. 97, Nos. 146155, 19704; vol. 96, No. 11721; vol. 90, No. 96887; vol. 84, No. 77752.

*Primary Examiner*—Brian E. Hearn
*Assistant Examiner*—Stephen J. Kalafut
*Attorney, Agent, or Firm*—Kenyon & Kenyon

[57] ABSTRACT

An electrolyte for a lead acid accumulator containing 5 to 30 g per liter of pyrophosphoric acid and 5 to 50 g per liter of orthophosphoric acid, the total quantity of phosphoric acid in the electrolyte being less than or equal to 60 g per liter.

4 Claims, No Drawings

ELECTROLYTE FOR A LEAD ACID ACCUMULATOR, AND AN ACCUMULATOR USING SAID ELECTROLYTE

The present invention relates to an electrolyte for a lead acid accumulator and to an accumulator using said electrolyte.

In conventional lead acid accumulators, it is well known that the electrolyte is an aqueous solution of sulphuric acid.

One known way of promoting deep discharges and of increasing the cycle lifetime of such batteries, is to add phosphoric acid to the electrolyte, and in particular to add orthophosphoric acid.

Such an electrolyte is described in French patent specification No. 642 145. The specification describes adding the phosphoric acid to the electrolyte in the form of orthophosphoric acid or in the form of substances which are transformed into orthophosphoric acid inside the accumulator, for example meta- or pyrophosphoric acid.

It has nonetheless been observed that inserting such phosphoric acid can lead to various drawbacks. Thus accumulators using such an electrolyte provide lower energy density per unit mass than accumulators using an electrolyte which has no phosphoric acid. Further, forming such accumulators is difficult. Finally, during cycling, short ciruits can be set up by migration of the positive active material, thereby reducing the service lifetime.

Preferred embodiments of the present invention mitigate these drawbacks.

The present invention provides an electrolyte for a lead acid accumulator, in which the electrolyte comprises an aqueous solution of sulphuric acid and contains phosphoric acid, characterized in that the electrolyte includes 5 to 30 grams per liter of pyrophosphoric acid and 5 to 50 grams per liter of orthophosphoric acid, the total quantity of phosphoric acids contained in the electrolyte being equal to or less than 60 grams per liter.

The invention also provides lead acid accumulators including the above-defined electrolyte.

Thus the Applicant has discovered, surprisingly, that simultaneously adding both ortho- and pyro-phosphoric acid to the sulphuric acid avoids the above-mentioned drawbacks which are observed when only one of said phosphoric acids is added on its own.

This means that a greater energy density is obtained, and that forming is easier, giving a longer initial discharges and a longer lifetime.

Preferably the quantities of orthophosphoric acid and of pyrophosphoric acid present in the electrolyte are substantially equal.

Advantageously they are present at a concentration of about 10 grams per liter.

The advantages which result from applying the invention can be seen by examining the test results which appear in the following table and which are expressed as follows:

E=energy density in Wh/kg;
D=duration, in minutes, of first discharge after forming;
N=number of cycles before the first short circuit (SC) appeared, or the number of cycles for which no short circuit (CC) was observed.

The accumulators differed only in the nature and the concentration of phosphoric acid in the electrolyte.

The tests were performed on sealed lead acid accumulators having 6 negative plates and 5 positive plates each. There were 100 grams of positive active material and the total capacity was 10 Ah. The grids of the positive and the negative plates were made from a lead-calcium alloy having 0.09% calcium.

The electrolyte included 94 cm$^3$ of $H_2SO_4$ at a density of 1.26 before forming, and it impregnated a separator made of glass felt.

Discharging was performed at a constant current of 2 A.

| Make up of phosphoric acid in the electrolyte and content in g/l | E | D | N |
| --- | --- | --- | --- |
| (1) ortho 5 + pyro 5 | 10.20 | 277 | no SC after 65 cycles |
| (2) ortho 10 | 9.95 | 270 | SC on 12th cycle |
| (3) pyro 10 | 9.95 | 270 | SC on 65th cycle |
| (4) ortho 50 + pyro 5 | 12.04 | 260 | SC on 12th cycle |
| (5) ortho 55 | 10.75 | 205 | SC on 1st cycle |
| (6) pyro 55 | 10.97 | 200 | SC on 1st cycle |
| (7) ortho 5 + pyro 30 | 11.88 | 275 | SC on 1st cycle |
| (8) ortho 35 | 11.40 | 270 | SC on 1st cycle |
| (9) pyro 35 | 11.08 | 270 | SC on 1st cycle |
| (10) ortho 30 + pyro 30 | 12.47 | 245 | SC on 12th cycle |
| (11) ortho 60 | 10.22 | 205 | SC on 1st cycle |
| (12) pyro 60 | 10.32 | 200 | SC on 1st cycle |
| (13) ortho 10 + pyro 10 | 11.83 | 290 | no SC after 136 cycles |
| (14) ortho 20 | 11.77 | 270 | SC on 1st cycle |
| (15) pyro 20 | 11.08 | 275 | SC on 1st cycle |

It appears from the table that the best compromise between capacity per unit mass and lifetime is obtained under the conditions of test 13, ie. 10 g/l of orthophosphoric acid and 10 g/l of pyrophosphoric acid.

Satisfactory results were also obtained with test 1.

It can be seen from test 4 when compared with tests 5 and 6 that while capacity per unit mass is slightly improved, lifetime greatly increased; the same effect can be seen when comparing test 10 with tests 11 and 12.

Finally, when test 7 is compared with tests 8 and 9, a small increase in capacity per unit mass is observed for equal lifetimes.

Similar results to the above have been obtained using nonsealed accumulators (with free electrolyte), in which the grids were made from a lead-antimony alloy containing 2.5% antimony.

Further, equivalent results have also been obtained in which the density of the sulphuric acid varied while the accumulator was being used.

The invention is applicable to all types of lead accumulators, and it is particularly suitable for sealed batteries.

Of course, the invention is in no way limited to the embodiments described, but covers on the contrary all variants thereof.

We claim:

1. An electrolyte for a lead acid accumulator, in which the electrolyte comprises an aqueous solution of sulphuric acid which includes orthophosphoric and pyrophosphoric acid, wherein said electrolyte is prepared by the step of adding an amount of pyrophosphoric and an amount of metaphosphoric acid to the aqueous sulphuric acid to provide an electrolyte, the initial concentration of which is 5 to 30 grams per liter of said electrolyte of pyrophosphoric acid and 5 to 50 grams per liter of said electrolyte of orthophosphoric acid, the total quantity of phosphoric acids contained in the electrolyte being equal to or less than 60 grams per liter.

2. An electrolyte according to claim 1, characterized in that the quantities of ortho- and of pyro-phosphoric acid present in the electrolyte are substantially equal.

3. An electrolyte according to claim 2, characterized in that there are about 10 grams per liter of ortho- and of pyro-phosphoric acid in the electrolyte.

4. A lead acid accumulator including an electrolyte according to any one of claims 1 to 3.

* * * * *